United States Patent
Hagenmaier et al.

[11] Patent Number: 6,162,475
[45] Date of Patent: Dec. 19, 2000

[54] EDIBLE FOOD COATINGS CONTAINING POLYVINYL ACETATE

[75] Inventors: Robert D Hagenmaier; Karel Grohmann, both of Winter Haven, Fla.

[73] Assignee: The United States of America as represented by the Secretary of Agriculture, Washington, D.C.

[21] Appl. No.: 09/281,276

[22] Filed: Mar. 30, 1999

[51] Int. Cl.$^7$ ..................................... A23L 1/058
[52] U.S. Cl. ..................... 426/102; 426/293; 426/302; 426/308; 426/309; 426/615; 426/616; 426/637
[58] Field of Search ................... 426/102, 293, 426/302, 308, 309, 615, 616, 637

[56] References Cited

U.S. PATENT DOCUMENTS

| | | | |
|---|---|---|---|
| 2,961,322 | 11/1960 | Winterberg | 99/166 |
| 3,410,696 | 11/1968 | Rosenfield | 99/168 |
| 3,554,767 | 1/1971 | Daum et al. | 426/102 |
| 4,463,778 | 8/1984 | Judd et al. | |
| 4,783,342 | 11/1988 | Polovina | 427/4 |
| 5,199,465 | 4/1993 | Stiem et al. | |

FOREIGN PATENT DOCUMENTS 586137   11/1959   Canada ................... 426/102

OTHER PUBLICATIONS

Hawley, G. The Condensed Chemical Dictionary, 10$^{th}$ Ed., Van Nostrand Reinhold Co., NY, p. 27, 1981.

T. Salazar–de–Buckle et al., *Revista–del–Instituto–de–Investigaciones–Technologicas*, vol. 15(86), pp. 33–47, 1973.

Primary Examiner—Helen Pratt
Attorney, Agent, or Firm—M. Howard Silverstein; John D. Fado; G. Byron Stover

[57] ABSTRACT

Compositions for preparing edible coatings for fruits, vegetables, and prepared foods, which include polyvinyl acetate, provide a coating with a high gloss.

15 Claims, 6 Drawing Sheets

EDIBLE FOOD COATINGS CONTAINING POLYVINYL ACETATE

BACKGROUND OF THE INVENTION

1. Field of the Invention

The present invention relates to compositions for preparing edible coatings for fruits, vegetables and prepared foods which includes polyvinyl acetate (PVA). It further relates to any fruit, vegetable or prepared food coated with the edible coating made with the composition which includes polyvinyl acetate.

2. Description of the Related Art

Polyvinyl acetate (PVA; acetic acid ethenyl ester homopolymer, CAS No. 9003-20-7) is a polymer with —[$CH_2CH(CH_3COO)$]— as the repeating unit. Polyvinyl acetate with minimum average molecular weight 2000 is approved by the United States Food and Drug Administration (FDA) as a direct food additive in chewing gum base under 21 CFR 172.615 with the restriction that it be used in amounts not to exceed what is required to produce the intended physical or technical effect (FDA, 1995). Polyvinyl acetate is also approved as an indirect food additive under the following 21 CFR provisions: 73.1 (inks), 175.105 (adhesives), 175.300 (metal coating), 175.320 (film coating), 176.160 (paper coating), 176.180 (paper component), 177.1200 (cellophane component), 177.2260 (filter component), 178.3910 (metal lubricant) and 181.30 (manufacture of food-contact paper).

Besides its many uses as chewing gum base (Song and Townsend, PCT-International Application WO96/28042 A1, 1996); Synosky and Reed, U.S. Pat. No. 5,286,500, 1994; Yung-Chu and Robinson, U.S. Pat. No. 5,236,721, 1993), polyvinyl acetate has been investigated as an ingredient in fungicide-carrying coatings for cheese (Fente-Sampayo et al., Archiv. fuer Lebensmittelhygiene, Volume 46(3), 62–65, 1995; Shiller et al, XX International Dairy Congress E, 1005–1006, 1978) and fruit (Fisher and Jonge, South African Patent 66/4464, 1968), as a sorbic acid carrier in a margarine wrapper (Harris and Rosenfeld, Food Processing Industry, Volume 43(516), 23–25, 1974), a cassava coating (Salazar de Buckle et al., Revista del Instituto de Investigaciojnes Technologicas, Volume 15(86), 33–47, 1973), an ingredient in sausage casings (Judd et al, U.S. Pat. No. 4,463,778, 1984; Stiem, German Patent Application DE 3842969 A1, 1990), and as an egg coating (Lin et al., J. Chinese Soc. Animal Sci., Volume 13(1), 55–63, 1984). Polyvinyl acetate films were not permeable to bacteria (Matsui et al., Report of Toyo Junior College of Food Technology and Toyo Institute of Food Technology, Volume 9, 89–93, 1970). Polyvinyl acetate has also been used in pharmaceutical coatings, especially those for controlled-release applications (Baichwal and McCall, U.S. Pat. No. 5,455,046, 1998; Froemming, German Offen. Patent DE 3918801 A1, 1991). Salazar de Buckle (1973, supra) disclose that paraffin coatings of cassava result in significantly less water vapor loss than a coating with a resin such as polyvinyl acetate. Fisher and Jong (1968, supra) used polyvinyl acetate in an emulsion for coating fruit.

While various uses of polyvinyl acetate are known in the art for food and pharmaceutical products, there remains a need in the art for highly effective high-gloss food coatings, especially for coating fruits, vegetables, and prepared foods. The present invention provides compositions and methods of use, which are different from related art compositions.

SUMMARY OF THE INVENTION

It is therefore, an object of the present invention to provide novel compositions for the preparation of edible coatings for fruits, vegetables, and prepared foods that include polyvinyl acetate.

A further object of the present invention is to provide novel compositions for the preparation of edible coatings for fruits, vegetables, and prepared foods that include polyvinyl acetate in an average molecular weight range of about 2,000 to about 50,000, with about 5,000 to about 30,000 preferred.

A still further object of the present invention is to provide novel compositions for the preparation of edible coatings for fruits, vegetables, and prepared foods that include polyvinyl acetate and at least one ingredient selected from the group consisting of plasticizers, surfactants, gloss enhancing additives, leveling agents, solvents, and mixtures thereof.

A still further object of the present invention is to provide novel compositions for the preparation of edible coatings for fruits, vegetables, and prepared foods that include polyvinyl acetate dissolved or dispersed in low molecular weight alcohols.

Another object of the present invention is to provide novel compositions for the preparation of edible coatings for fruits, vegetables, and prepared foods that include polyvinyl acetate dissolved or dispersed in low molecular weight alcohols, wherein said alcohols are in a concentration range of about 45% to about 98%, with about 70% to about 95% preferred.

Another object of the present invention is to provide fruits, vegetables, and prepared foods coated with novel edible coatings that include polyvinyl acetate.

Further objects and advantages of the present invention will become apparent from the following description.

DETAILED DESCRIPTION OF THE INVENTION

Figure 1:
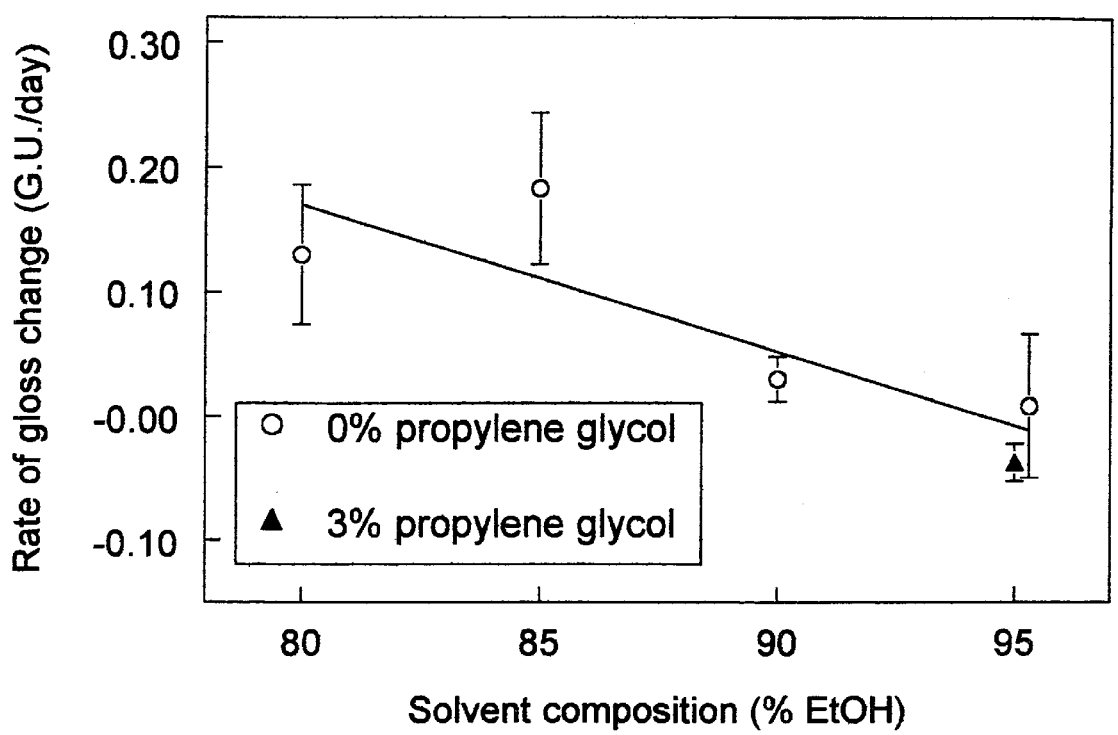
FIG. 1 is a graph showing rate of change of gloss at about 20° C. of polyvinyl acetate, with an average molecular weight of about 12,000 (PVA12), coatings on test sheets with or without about 3 grams propylene glycol/100 grams polyvinyl acetate at different solvent ethanol contents.

One of the primary purposes of applying coatings to food products is to improve the appearance coatings impart to the food, especially gloss. It is of some importance that the gloss remains stable from application to consumption.

The coating of the present invention, contains food-grade polyvinyl acetate. It has a high gloss as compared to commercially used coating formulations. It forms a glossy coating on fruits, vegetables, and prepared foods. Fruit and vegetables coated with the compositions of the present invention do not whiten or 'blush' after contact with water.

Polyvinyl acetate has commercial advantages over certain other edible coating polymers such as shellac. Polyvinyl acetate costs only about 30% as much as shellac. The supply of shellac is uncertain and shellac has the disadvantage of being an insect exudate which some consumer groups find objectionable. In the apple industry, for example, virtually all coatings applied to fresh apples contain shellac. Any change in shellac acceptability or supply might leave the apple industry without an acceptable coating to use.

The edible compositions of the present invention include food-grade polyvinyl acetate with an average molecular weight of at least about 2,000. Any food-grade polyvinyl acetate which imparts gloss to a particular fruit, vegetable or prepared food when used in a coating formulation of the present invention, is useful in the present invention. For purposes of the present invention, a desirable gloss is defined as a gloss which is competitive with the gloss that is imparted by coatings currently, commercially used. An average molecular weight for polyvinyl acetate in the range of about 2,000 to about 50,000 is useful, while it is preferred to use a polyvinyl acetate with an average molecular weight in the range of about 5,000 to about 30,000. For the purposes of the present invention, an average molecular weight for polyvinyl acetate is taken to mean that the preparation of polyvinyl acetate used contains a mixture of molecules of different weights and that, for example, an average molecular weight of about 12,000 is really an average of the molecular weights of the different molecules in the preparation. Mixtures of polyvinyl acetates with different average molecular weights is also useful as long as the mixture imparts the desired gloss. A typical mixture contains at least two polyvinyl acetates with different average molecular weights in a ratio of about 1:1. The concentration of polyvinyl acetate in the composition of the present invention ranges from about 4% to about 30% (wt:wt) with a concentration of from about 15% to about 25% preferred and about 20% most preferred.

The compositions of the present invention further include a solvent. Examples of solvents useful in the present invention include aqueous mixtures low molecular weight alcohols such as ethanol, isopropanol, methanol, and mixtures thereof; propylene glycol, polysorbate 20, acetylated monoglycerides, etc. Low molecular weight alcohols are preferred. These can be used at a concentration of about 45% to 98%, with about 70% to about 95% preferred.

Plasticizers, surfactants, leveling agents, gloss enhancing additives, solvents, and film-forming polymers can optionally be included in the composition of the present invention as long as the compositions of the present invention retain the gloss and/or gas permeabilites desired for the coated fruit, vegetable or prepared food. A plasticizer makes the coating more flexible and leveling agents help to spread the coating on the surface. Examples of useful plasticizers include propylene glycol, glycerine, etc. The concentration of plasticizer is any concentration useful in the present invention such that the coating retains the gloss desired for the coated fruit, vegetable, or prepared food. From about 0% to about 15% of the polyvinyl acetate concentration (this is about 0% to about 5% of the liquid coating) is a useful range, with a preferred range of about 2% to about 10% of the polyvinyl acetate concentration (this is about 0.2% to about 3% of the liquid coating. Concentration of the plasticizer is based on amount of polyvinyl acetate.

Examples of useful surfactants include polysorbate 20, acetylated monoglycerides, etc. The concentration of surfactant is any concentration useful in the present invention such that the coating retains the gloss desired for the coated fruit, vegetable, or prepared food. From about 0% to about 15% of the polyvinyl acetate concentration is a useful range, with a range of about 2% to about 10% of the polyvinyl acetate concentration preferred.

Examples of useful gloss enhancers include propylene glycol, low molecular weight alcohols, etc. The concentration of gloss enhancers is any concentration useful in the present invention such that the coating retains the gloss desired for the coated fruit, vegetable or prepared food. From about 0% to about 10% is a useful range, with a range of about 0.3% to about 5% of the polyvinyl acetate concentration preferred.

Examples of useful film-forming polymers include shellac and wood rosin. The concentration of film-forming polymers is any concentration useful in the present invention such that the coating retains the gloss desired for the coated fruit, vegetable or prepared food. From about 0% to about 90% of film-forming polymers is a useful range, with about 20% to about 60% preferred.

Many of the ingredients can have more than one function. For example polyvinyl acetate is a plasticizer and gloss enhancer; propylene glycol is a gloss enhancer, plasticizer, and solvent; polysorbate 20 is a plasticizer, surfactant, and solvent; and low molecular weight alcohols are leveling agents, gloss enhancers, and solvents.

In practicing the present invention, the aforementioned compositions are applied to an exterior surface of a fruit, vegetable, fungus, prepared food such as confectionaries, baked goods or other food so as to from a protective, edible coating. The exterior surface may for example be a rind or peel or skin or a hardened confectionary surface. In practicing the present invention, it should be considered that compositions of the instant invention may not adhere well to surfaces having excessive surface moistures. Consequently, for some extremely wet fruits/vegetables and other foods, it may be necessary to dry the surface thereof prior to applying the compositions of the present invention.

The specific method of application is not critical to the present invention, and may include any of a variety of well known application techniques such as: dipping or rolling the fruit, vegetable, or prepared food in the coating composition; applying the composition by brushing, roller or wipe; spraying the composition onto the fruit, vegetable, or prepared food such as using a sprayer or atomizer. It is preferred to apply the composition at a temperature of about 5° C. to about 50° C., with about 15° C. to about 30° C. preferred in an amount sufficient to wet the surface. The coating may then be permitted to dry, or steps may be taken to expedite drying of the coating, prior to any further handling or processing.

The present invention may be practiced with any of a wide variety of fruits, vegetables, fungi, or prepared foods including, but not limited, to for example: citrus fruits (e.g. grapefruit, orange, lemons, kumquat, limes, tangerine and pommelo), apples, pears, tomatoes, tropical fruits (e.g. carambolas, bananas, guavas, papayas, mangoes, avocados, atemoyas,), melons, stone fruits (e.g. peach, plum, cherry, nectarines), berries (e.g. strawberries, blueberries), passion fruit, pear, grapes, pineapple, persimmon, kiwi, root crops (peanuts, potatoes, carrots, onions), squash, beans, cucumber, tree nuts, legumes, mushrooms, confectionaries such as candies, etc.

EXAMPLES

The following examples illustrate the use of the invention for coating apples, tangerine, grapefruit and chocolates. They are intended to further illustrate the invention and are not intended to limit the scope of the invention as defined by the claims.

Statistix 4.1 (Analytical Software, Tallahassee, Fla.) was used for computation of statistical parameters. The LSD statistic was used for comparison of means. On the figures, the error bars show standard errors except when these are covered by symbols.

Example 1

One purpose of applying coatings to food products is to reduce oxidation and moisture loss and in the case of fruit coatings to restrict exchange of $CO_2$ and $O_2$ between atmosphere and interior of the respiring fruit.

The Polyvinyl acetate coating contained Century Plus chewing gum base resin types GB-30 (PVA30) and AYAC-L (PVA12) pastille grade from Union Carbide Corp. (Danbury, Conn.). Both grades, according to the manufacturer, contain <0.02% vinyl acetate, which is the unreacted monomer. The polyvinyl acetate was dissolved in about 95% ethanol or isopropanol to make stock solutions. The polyvnyl acetate coating preparations were as follows: (a) about 25% PVA12 and 3% propylene glycol in about 95% ethanol; and (b) about 50% PVA12:50% shellac, wherein said starting solution of each was about 25% of polyvinyl acetate and about 20% of shellac in about 95% ethanol with 5% propylene glycol. The shellac coatings were (a) about 20% shellac and about 1.8% glycerine in about 95% ethanol. All the coatings were brushed onto polyethylene film and stored at about 25° C. for at least about two days before measurement of permeance.

Water vapor permeance was measured on the Permatran W1A (Mocon, Minneapolis, Minn.) and oxygen permeance on the Oxtran 100 (Mocon). In both cases measurements of permeances of coated and uncoated support film were used to determine permeance of the coating. Humidity was altered by adjustment of the humidity of the air stream flowing over the film in the permeance cell. The support film was cellulose acetate and polyethylene, respectfully for the measurement of water vapor and oxygen permeability. Thickness of the coating was determined from weight of coated and uncoated support film. Reported results are the means of 3 trials.

Oxygen and water permeance were both higher for polyvinyl acetate than shellac, a high-gloss coating used on many food products (Table 1). Oxygen permeance was increased by addition of propylene glycol and decreased by inclusion of shellac or reduction in relative humidity of the coating (Table 1 below). For comparison with other packaging films, the oxygen permeability of polyvinyl acetate without plasticizer or shellac is approximately the same as that of high density polyethylene, and its water vapor permeability is roughly the same as that of cellophane (Sacharow and Griffin, Principles of Food Packaging, page 47, AVI, Westport, Conn., 1980).

TABLE 1

Permeance of Polyvinyl acetate and Shellac Coatings at about 30° C.

| Coating | Plasticizer (% of Polymer) | Coating Relative Humidity (%) | Oxygen Permeability (ml mil m$^{-2}$ d$^{-1}$ atm$^{-1}$) | Water Vapor Permeability (g mil m$^{-2}$ d$^{-1}$ mmHg$^{-1}$) |
|---|---|---|---|---|
| PVA | 3% PG[d] | 80 | 2682[c] | 85[b] |
| PVA | none | 80 | 1761[b] | no value |
| PVA | none | 30 | 1423[b] | no value |
| 50% shellac plus 50% PVA; | 5% PG; | 80 | 1346[b] | no value |
| Shellac | 1.8% glycerine | 80 | 366[a] | 4.0[a] |

[a-c]Means in a column with no superscript in common differ significantly ($P < 0.05$, $n = 3$)
[d]PG = Propylene glycol Example 2

A property of food coatings that is often more important than permeance is the appearance it imparts to the coated object, especially the gloss. It is of some importance that the gloss be stable with time. The gloss of polyvinyl acetate films on test sheets, made from ethanolic solutions of polyvinyl acetate, were tested with and without plasticizer. Coatings on citrus and apples were also tested for gloss and blush.

The following coatings were used for testing gloss of coatings on film:
  a. About 20% PVA12 in about 80% ethanol
  b. About 20% PVA12 in about 85% ethanol
  c. About 20% PVA12 in about 90% ethanol
  d. About 20% PVA12 in about 95% ethanol
  e. About 20% PVA12 plus about 4% propylene glycol(% of Polyvinyl acetate) in about 95% ethanol
  f. About 30% PVA12 plus about 4% Cetodan 90-50 (% Polyvinyl acetate) in about 95% ethanol
  g. About 30% PVA30 plus about 4% Cetodan 90-50 (% Polyvinyl acetate) in about 95% ethanol
  h. About 25% PVA12/30 (blend of 50% each of PVA12 and PVA30) plus about 8% glycerine (% Polyvinyl acetate) in about 95% ethanol
  i. About 25% PVA12/30 (as in h above) plus about 8% sorbitol in about 95% ethanol
  j. About 25% PVA12/30(as in h above) in about 67% isopropanol
  k. About 11% PVA12/30 (as in h above) and about 11% Staybelite (the mixture is about 50% of the Polyvinyl acetate mixture plus about 50% Staybelite) in about 98% isopropanol.
  l. About 11% PVA12/30 (as in h above) and about 11% Staybelite (as in k above) in about 83% isopropanol.
  m. About 11% PVA12/30 and about 11% Pentalyn 856 in about 67% isopropanol (the mixture is about 50% of the Polyvinyl acetate mixture plus about 50% Pentalyn 856).
  n. About 25% of PVA12/30 (as in h above) plus about 10% polysorbate 20 (PS20; % of Polyvinyl acetate) in about 67% isopropanol Coatings used to test for gloss on coatings for fruit are:
  a. About 10% each of PVA12 and PVA30, plus about 1.4% propylene glycol, in about 95% ethanol b. A commercial carnauba wax-shellac coating, Johnson's Primafresh HS was used as recommended.
c. High-gloss resin coatings for citrus and apples. The citrus coatings were Decco 402 and Brogdex 555. The apple coatings were Shield-Brite AP40 and Solutec V7. These were used as recommended.

The coatings were applied to fruits by hand using latex gloves at a rate of 0.3 grams coating per fruit. The fruit coatings were dried at about 25° C. for about 20 minutes, then at about 50° C. for about 5 minutes.

Coating shine, in gloss units (G.U.) was measured with a reflectance meter (micro-TRI-gloss, BYK Gardner Inc., Silver Spring, Md.). For measurement of gloss of fruit surfaces this meter was fitted with a shield having about a 19 mm diameter opening. For measurement of gloss of flat surfaces, the film were formed by drying about 0.1 mm thick films for about 15 minutes at about 45° C. Gloss was measured at an angle of about 20° for films formed on WP-1 wax and polish sheets (Lenata Co., Mahwah, N.J.)-films a-i and k-n. Gloss was measured at an angle of about 60° for films formed on low-density polyethylene film. All gloss measurements represent means of 10 measurements each on at least 2 samples.

Figure 2:
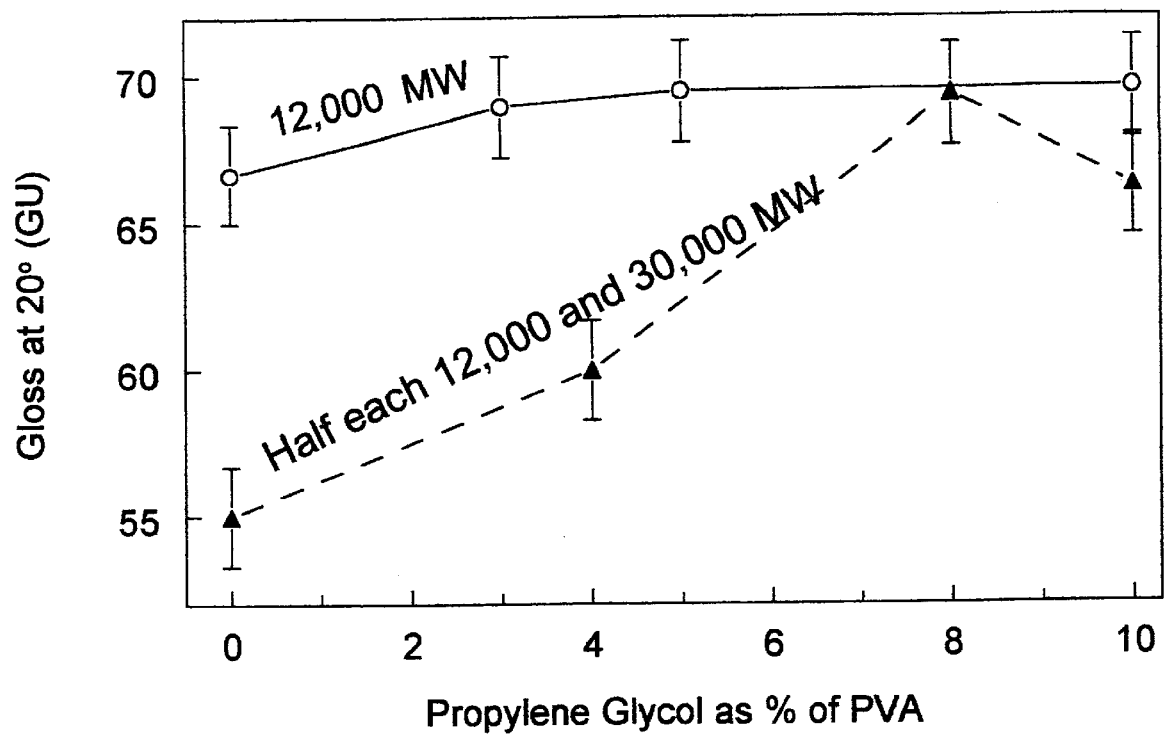
FIG. 2 is a graph showing gloss on test sheets of coatings made from about 95% ethanol solutions of polyvinyl acetate, with an average molecular weight of about 12,000 (PVA12), and about a 1:1 blend of PVA12 and polyvinyl acetate with an average molecular weight of about 30,000 (PVA30) at different levels of propylene glycol.

Coatings made from PVA12, average molecular weight about 12,000, tended to have higher gloss on test sheets than those made from PVA30, average molecular weight 30,000, although the difference was not significant with addition of about 8–10 grams of propylene glycol per about 100 grams of polyvinyl acetate (FIG. 2). Addition of sorbitol greatly reduced the gloss (Table 2 below). Polyvinyl acetate with about 10% monoglyceride had similar low gloss (data not shown). Coatings with Cetodan 90-50 were somewhat less glossy than those with propylene glycol (Table 2 below). Formulations with about 1% Polysorbate 20 or about 3% butyl acetate, added as finishing solvents, did not make films with higher gloss. Coatings that contained Polysorbate 20,60, or 80 tended to bead up on the test sheets, leaving most of the surface uncovered and with very low gloss (data not shown). However, coatings with Polysorbate 20 did spread well on polyethylene film which suggests this might be a useful additive for a food product whose surface properties are more like polyethylene film than the test card. Polyvinyl acetate coatings on polyethylene film, containing about 67% isopropanol solutions, were made with or without addition of about 10 grams Polysorbate 20 per about 100 g polyvinyl acetate had, respectfully, gloss at about 60° of about 94.3 and about 69.0 G.U.

Figure 3:
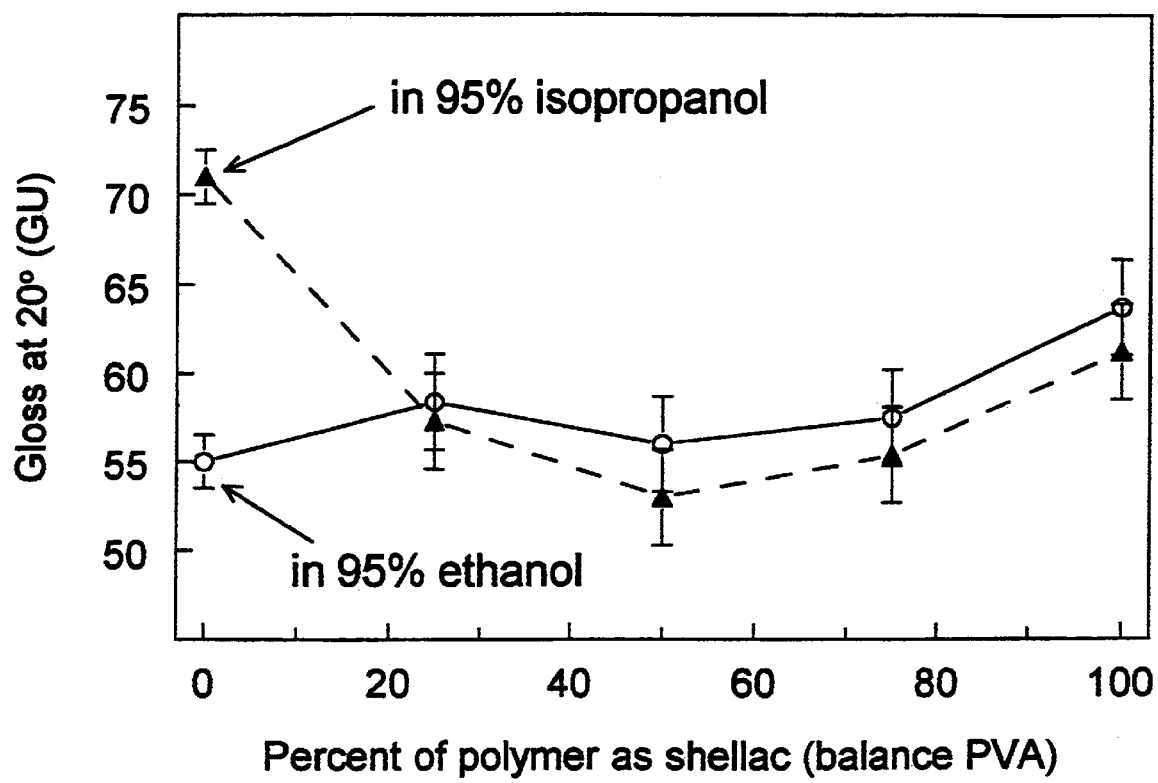
FIG. 3 is a graph showing gloss on test sheets of polyvinyl acetate-shellac coatings made without propylene glycol. The polyvinyl acetate component was a 1:1 blend of PVA12 and PVA30.

Coatings made from mixtures of polyvinyl acetate and wood rosin preparations, Staybelite and Pentylin 856, had high gloss (Table 2). The polyvinyl acetate-shellac coatings had good gloss over the range of about 1:3 to about 3:1 ratio of shellac to polyvinyl acetate, although not as high as polyvinyl acetate without shellac in about 95% isopropanol (FIG. 3).

Some experimental formulations were made by mixing alcoholic solutions of polyvinyl acetate with alcoholic solutions of other film formers. For example, when clear solutions of polyvinyl acetate in about 75% or about 95% ethanol were mixed with solutions of zein in the same solvents, separate liquid phases were formed and no coatings were made for testing.

Figure 4:
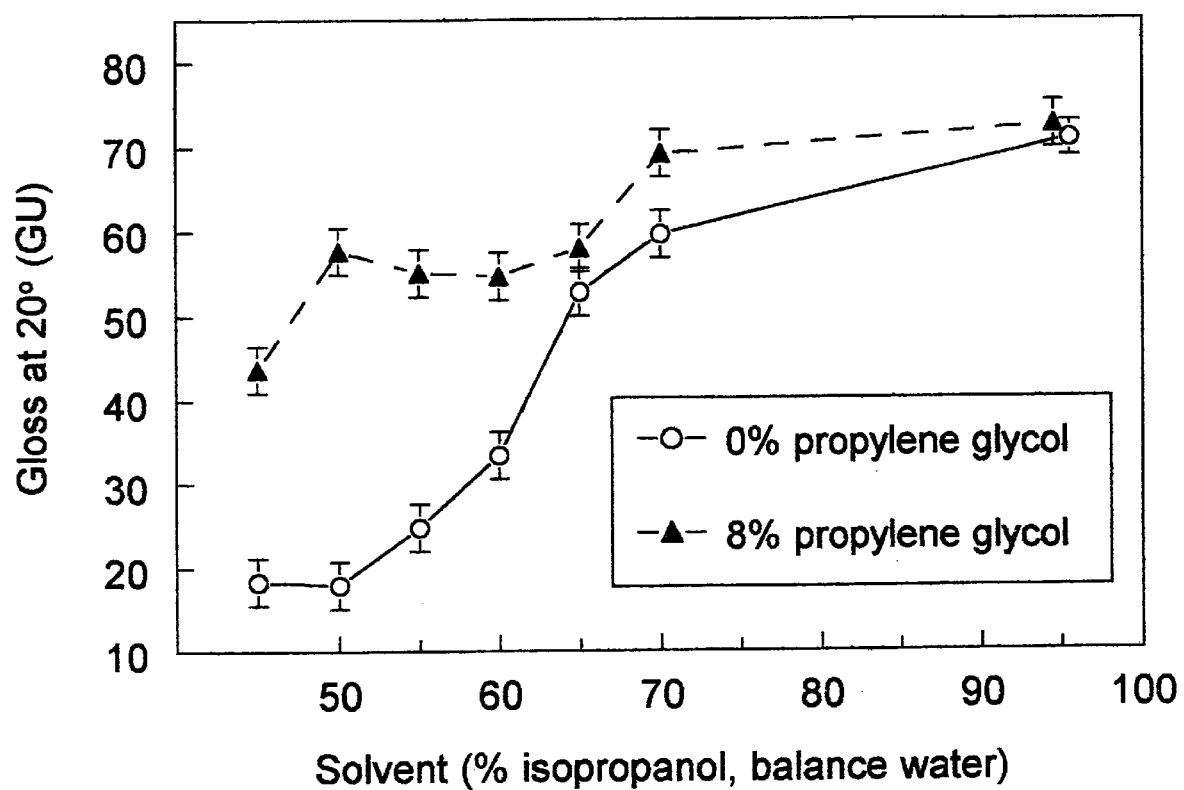
FIG. 4 is a graph showing gloss on test sheets of a 1:1 blend of PVA12 and PVA30, with and without about 8 grams propylene glycol/100 grams polyvinyl acetate, at different concentrations of isopropanol (solvent).
Figure 5:
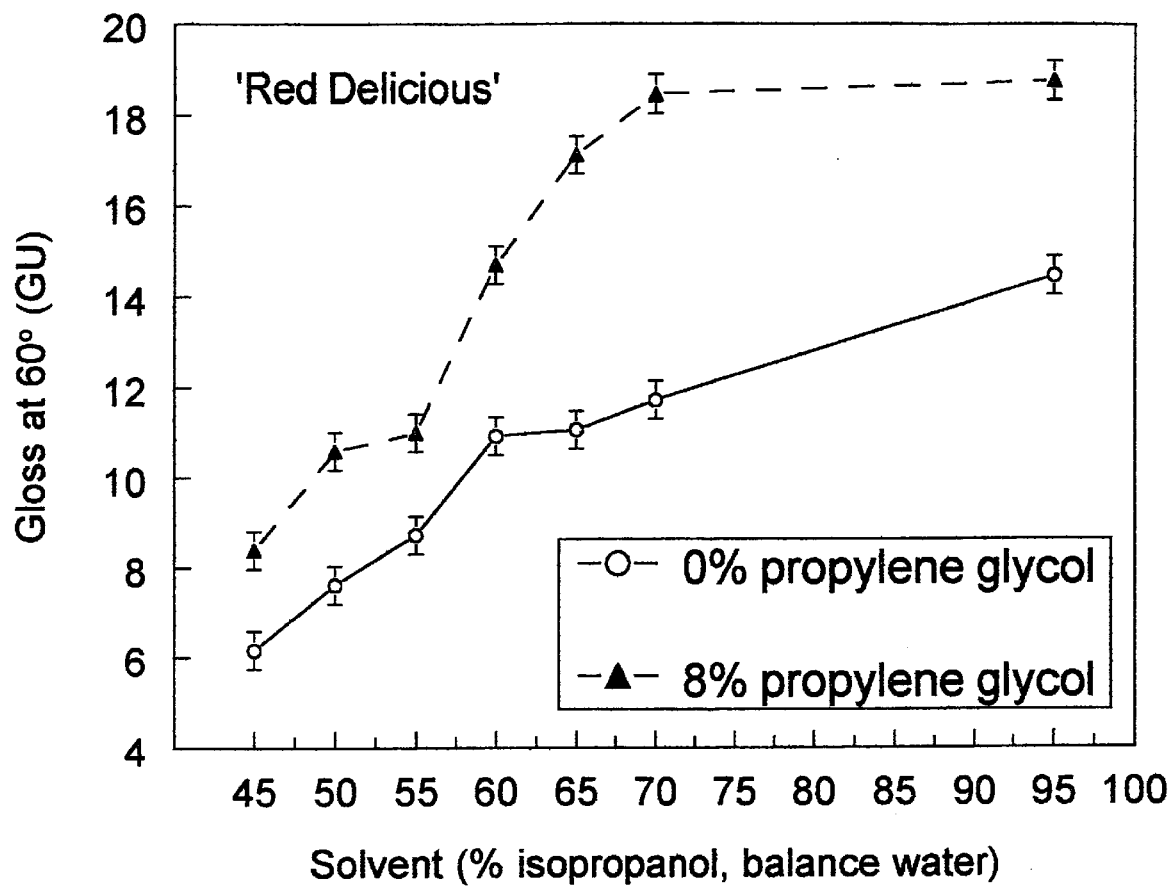
FIG. 5 is a graph showing gloss on 'Red Delicious' apples using a blend of about a 1:1 blend of PVA12 and PVA30 with zero or about 8 grams propylene glycol per about 100 grams polyvinyl acetate at different concentrations of isopropanol (solvent) (3 apples/treatment, 10 gloss measurements).
Figure 6:
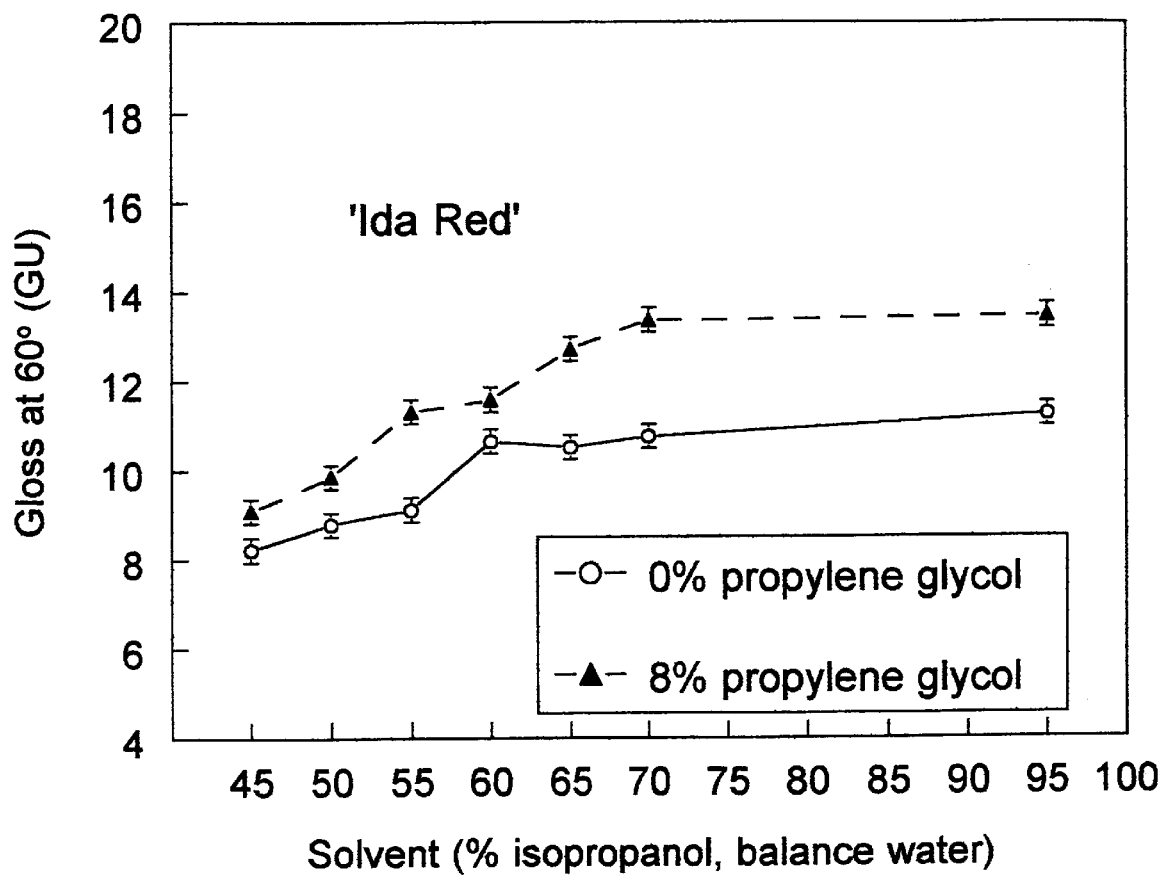
FIG. 6 is a graph showing gloss on 'Ida Red' apples using a blend of about a 1:1 blend of PVA12 and PVA30 with zero or about 8 grams propylene glycol per about 100 grams polyvinyl acetate with different concentrations of isopropanol (solvent) (3 apples/treatment, 10 gloss measurements).

It would seem preferable for economic, safety, and environmental reasons to use less alcohol to dissolve the polyvinyl acetate. Unfortunately, gloss of polyvinyl acetate coatings on test sheets or apples tended to decrease as part of the alcohol was replaced with water (FIGS. 4–6 and Table 2). The decrease was somewhat abated by the addition of propylene glycol. With about 8 grams of propylene glycol per about 100 grams of polyvinyl acetate, the gloss on test sheets was still high with about >50% isopropanol (FIG. 4), and on apples with about >65% isopropanol (FIGS. 5 and 6).

Apples coated with ethanolic polyvinyl acetate had gloss that was almost the same as those with shellac coatings (Table 3). Citrus fruit with this particular polyvinyl acetate coating, however, had significantly less gloss than that imparted by the shellac-rosin coatings (Table 3). After exposure of the dried coating to water, apples and citrus fruit with rosin or shellac-containing coatings developed white spots (often called blush) where the coating fractured and pulled away from the surface, whereas none was observed on fruit with polyvinyl acetate coatings (Table 3). Blush is well known to be a serious problem with the high-gloss coatings commonly used for fresh citrus fruit and apples, and therefore absence of blush should be a significant advantage for polyvinyl acetate coatings.

Ethanol and isopropanol were both used as solvents. The gloss of the PVA12-PVA30 blend was about 70.1±0.9 with about 95% isopropanol as solvent compared with about 55.0±1.5 for about 95% ethanol (FIG. 3). For the same polyvinyl acetate blend with about 8 grams propylene glycol/100 grams polyvinyl acetate, the gloss was about 72.7±2.8 with about 95% isopropanol as solvent (FIG. 4) and about 69.4±1.7 with ethanol as solvent (FIG. 2).

TABLE 2

Gloss of various Polyvinyl acetate films after 1 day storage.

| Resin | Additive (% of PVA) | Solvent | PVA Conc. (%) | Test sheet Gloss (GU 20°) |
|---|---|---|---|---|
| PVA12 | none | 80% EtOH | 20 | 33.0[d] |
| PVA12 | none | 85% EtOH | 20 | 59.7[b] |
| PVA12 | none | 90% EtOH | 20 | 67.8[a] |
| PVA12 | none | 95% EtOH | 20 | 67.7[a] |
| PVA12 | 4% PG | 95% EtOH | 20 | 71.4[a] |
| PVA12 | 4% C90-50 | 95% EtOH | 30 | 59.0[b] |
| PVA30 | 4% C90-50 | 95% EtOH | 30 | 46.9[c] |
| PVA12/30 | 8% glycerine | 95% EtOH | 25 | 47.7[c] |
| PVA12/30 | 8% sorbitol | 95% EtOH | 25 | 6.2[e] |
| PVA12/30 & Staybelite[h] | none | 98% iPrOH | 22 | 72.9[a] |
| PVA12/30 & Staybelite[h] | none | 83% iPrOH | 22 | 46.2[c] |
| PVA12/30 & Pentalyn856[h] | none | 98% iPrOH | 22 | 70.7[a] |

[a-e]Means in a column with no superscript in common differ significantly (P < 0.05).
[f]Blend of about 50% each of polyvinyl acetate12 and Polyvinyl acetate30.
[g]Abbreviations: PG = propylene glycol, PS20 = polysorbate 20, C90-50 = Cetodan 90-50
[h]These mixtures are of about 50% polyvinyl acetate and about 50% Staybelite or Pentalyn 856

TABLE 3

Appearance of apples and citrus with polyvinyl acetate or commercial coatings.

| | Gloss Rank | | Blush (%)[f] | |
|---|---|---|---|---|
| Type of Coating[d] | Citrus[e] | Apple[e] | Citrus | Apple |
| PVA | 1.8[a] | 3.7[a] | 0[a] | 0[a] |
| Carnuba-shellac | 1.6[a] | 1.9[b] | 0[a] | 50[b] |

TABLE 3-continued

Appearance of apples and citrus with polyvinyl acetate or commercial coatings.

|  | Gloss Rank | | Blush (%)[f] | |
| --- | --- | --- | --- | --- |
| Type of Coating[d] | Citrus[e] | Apple[e] | Citrus | Apple |
| High Gloss Resin | 3.3[b] | 3.8[a] | 80[b] | 100[c] |

[a–c]Means in a column with no superscript in common differ significantly ($P < 0.05$)
[d]The high-gloss apple coatings were shellac-baced, the high-gloss citrus coatings contained both shellac and wood rosin. The polyvinyl acetate coating formulation: about 10% each of PVA12 and PVA30 and about 1.4% PG dissolved in about 95% EtOH.
[e]Panel evaluation after 7 days at about 21° C. Higher rank = better gloss.
[f]% of fruit with whitening of coating, measured one day after submersion for about 10 minutes in water.

Example 3

Samples for internal $O_2$ and $CO_2$ (5 fruit per treatment, each experiment) were withdrawn with a syringe (previously flushed with $N_2$ to remove traces of oxygen) from fruit submerged in water. The $O_2$ and $CO_2$ concentrations were measured with a Hewlett Packard 5890 gas chromatograph fitted with a CTR-1 column (about 6 feet long, ¼ inch and ⅛ inch diameter, outer and inner columns, respectively, Alltech, Deerfield, Ill.). Samples were applied with a loop injector. Column flow rate was about 140 ml/minute. Temperatures were about 40° C. and about 120° C., respectively, for the column and thermal conductivity detector. Standard gas mixtures were used for calibration, taking into consideration that argon gas elutes at the same time as $O_2$ from the CTR column.

Compared to citrus fruit coated with commercial, high-gloss, shellac-based coatings, those with polyvinyl acetate coatings had slightly lower internal $CO_2$ concentrations and about half the ethanol content (Table 4). The internal $O_2$ for the grapefruit, however, was about the same for polyvinyl acetate and resin coatings, suggesting that the polyvinyl acetate coating blocked $O_2$ exchange, which was possible if the polyvinyl acetate coating blocked pores in the surface of the fruit (Hagenmaier and Shaw, J. Agric. Food Chem., Volume 41, 283–287, 1993, herein incorporated by reference). High coating permeance, therefore, is not a guarantee that the coating will not markedly reduce gas exchange. Because citrus fruit with high ethanol content tends to have lower flavor (Ahmad and Khan, Plant Foods for Human Nutrition, Volume 37, 47–57, 1987), polyvinyl acetate coatings have an advantage over the shellac-rosin coatings in this respect. Apples with polyvinyl acetate coatings had relatively low ethanol content (Table 5 below). Apples and citrus with polyvinyl acetate coatings had somewhat higher values of weight loss compared with other coatings (Table 6), as might be expected from the high water vapor permeance of polyvinyl acetate (See Table 1 supra).

TABLE 4

Internal gases and ethanol of citrus fruit coated with Polyvinyl acetate or commercial high-gloss coatings.

|  |  | Internal gases (%) | | Ethanol[e] |
| --- | --- | --- | --- | --- |
| Variety | Coating[d] | $O_2$ | $CO_2$ | (mg/kg) |
| 'Fallglo' Tangerine | PVA | 9.2[a] | 8.4[a] | 390[a] |
|  | High-gloss shellac/rosin | 2.8[b] | 11.7[b] | 800[a] |
| 'Ray Ruby' grapefruit | PVA | 2.3[a] | 5.0[a] | 347[a] |
|  | High-gloss shellac/rosin | 2.0[a] | 7.2[b] | 772[b] |

[a–b]For each variety, means in a column with no superscript in common differ significantly ($P < 0.05$).
[c]The polyvinyl acetate coating formulation: about 10% each of PVA12 and PVA30, about 1.4% PG, and about 95% EtOH.
[d]The results for high-gloss coatings are the mean results for two such coatings.
[e]Ethanol content before storage was about 55 and about 14 mg.kg respectively for tangerines and grapefruit.

TABLE 5

Ethanol content of apples coated with Polyvinyl acetate or commercial high-gloss coatings.

|  | Ethanol content of juice (mg/kg) | |
| --- | --- | --- |
| Coating | 'Winesap' | 'Red Delicious' |
| PVA | 213[a] | 70[a] |
| Wax-shellac | 393[a] | 90[a] |
| High-gloss shellac | 681[b] | 352[b] |

[a–b]Means in a column with no superscript in common differ significantly ($P < 0.05$)
[c]The Polyvinyl acetate coating formulation: about 10% each PVA12 and PVA30, about 1.4%. PG, and about 95% EtOH.
[d]The results for high-gloss shellac are mean results for two such coatings.
[e]Ethanol content before storage was about 60 and 9 mg/kg, respectively for 'Winesap' and 'Red Delicious' apples.

TABLE 6

Weight loss (%/day) of fruit with Polyvinyl acetate and other commercial coatings.

|  | Apples | | |
| --- | --- | --- | --- |
| Type of Coating | Grapefruit 'Ray Ruby' | Red Delicious | Winesap |
| Carnauba-shellac | 0.34[a] | 0.10[a] | 0.14[a] |
| PVA[c] | 0.49[b] | 0.11[ab] | 0.15[b] |
| High gloss shellac/rosin | 0.40[a] | 0.12[b] | 0.17[b] |

[a–b]Means in a column with no superscript in common differ significantly ($P < 0.05$).
[c]The polyvinyl acetate coating formulation: about 10% each PVA12 and PVA30 and about 1.4% PG dissolved in about 95% EtOH.

Example 4

Chocolates were coated with various compositions. The chocolates were 'Dove Promises' made from semisweet chocolate, sugar milkfat, soy lecithin, and flavors (Mars, Inc., Hackettstown, N.J.). The coating compositions used were:

a. About 21 grams PVA12 about 0.6 grams propylene glycol, and about 79 grams of about 95% ethanol.
b. About 20 grams shellac, about 1.8 grams glycerin, and about 78 grams of about 95% ethanol.

Chocolates were coated by dipping in the coating solutions described in Table 7 below. The coatings were dried at room temperature, about 25° C., for about 15 hours before measurement of one-coat gloss and about 4 hours after the application of the coating for the two-coat gloss. Candies were either coated with one layer or two.

The polyvinyl acetate composition imparted gloss to chocolate candies (Table 7 below). Currently, ethanolic solutions of shellac are used as confectionary glaze for chocolates. Polyvinyl acetate, which is currently about ⅓ the cost of shellac would have economic advantages.

TABLE 7

Gloss of chocolates with shellac and Polyvinyl acetate coatings. The gloss was 1.0 with no coating applied. Means of 3 trials.

| Coating Formulation | | Gloss at 60° (G.U.) | |
|---|---|---|---|
| | | Coated once | Coated Twice |
| PVA12 | ~21 g. | 25.7[a] | 40.7[a] |
| propylene glycol | ~0.6 g. | | |
| ~95% ethanol | ~79 g. | | |
| Shellac | ~20 g | 19.5[b] | 26.5[b] |
| glycerin | ~1.8 g. | | |
| ~95% EtOH | ~78 g. | | |

[a–b]Means in a column with no superscript in common differ significantly ($P < 0.05$).

The foregoing detailed description is for the purpose of illustration. Others skilled in the art can apply the knowledge described to other foods and agricultural commodities. Such detail is solely for that purpose and those skilled in the art can make variations therein without departing from the spirit and scope of the invention.

We claim:

1. A composition comprising
   a polyvinyl acetate with an average molecular weight in the range of about 2,000 to about 50,000, in amounts effective to provide an edible high-gloss coating for fruits, vegetables, root crops, tree nuts, and prepared foods, wherein said polyvinyl acetate is dissolved in a low molecular weight alcohol.

2. The composition of claim 1 wherein the polyvinyl acetate is also in amounts effective for restricting the movement of oxygen and other gases in and/or out of coated fruits, vegetables, and prepared foods.

3. The composition of claim 1 wherein said fruits, vegetables and root crops are selected from the group consisting of apples, citrus, pears, mangos, melons, papayas, nectarines, plums, tomatoes, cherries, avocado, cucumber, squash, peanuts potatoes, carrots, and onions.

4. The composition of claim 1 further comprising at least one ingredient selected from the group consisting of plasticizers, low molecular weight alcohols, surfactants, leveling agents, solvents, film-forming polymers and mixtures thereof.

5. The composition of claim 1 wherein said alcohol is in a concentration range of about 45% to about 98%.

6. The composition of claim 1, wherein said low molecular weight alcohol is selected from the group consisting of methanol, ethanol, isopropanol, and mixtures thereof.

7. The composition of claim 1, said composition consisting essentially of
   a polyvinyl acetate with an average molecular weight in the range of about 2,000 to about 50,000, in amounts effective to provide an edible high-gloss coating for fruits, vegetables, root crops, tree nuts, and prepared foods, wherein said polyvinyl acetate is dissolved in a low molecular weight alcohol.

8. A composition comprising
   (a) polyvinyl acetate with an average molecular weight of about 12,000,
   (b) a gloss-enhancing additive, and
   (c) a low molecular alcohol selected from the group consisting of ethanol and isopropanol;
   wherein said composition provides an edible high-gloss coating for a fruit, vegetable, root crop, tree nut or prepared food.

9. The composition of claim 8, said composition consisting essentially of
   (a) polyvinyl acetate with an average molecular weight of about 12,000,
   (b) a gloss-enhancing additive, and
   (c) a low molecular alcohol selected from the group consisting of ethanol and isopropanol;
   wherein said composition provides an edible high-gloss coating for a fruit, vegetable, root crop, tree nut or prepared food.

10. A fruit, vegetable, root crop, tree nut, or prepared food coated with an edible composition comprising polyvinyl acetate in amounts effective to produce a high gloss coating, wherein said polyvinyl acetate is dissolved in a low molecular weight alcohol.

11. The fruit or vegetable of claim 10 selected from the group consisting of apples, oranges, tangerines, grapefruit, pommelo, lemons, limes, kumquats, pears, mangoes, melons, papayas, nectarines, plums, tomatoes, cherries, avocado, cucumber, squash, root crops, and tree nuts.

12. The prepared food of claim 10 comprising a confectionary.

13. The prepared food of claim 12 wherein said confectionary is candy.

14. The fruit, vegetable, root crop, tree nut, or prepared food of claim 10, wherein said low molecular weight alcohol is selected from the group consisting of methanol, ethanol, isopropanol, and mixtures thereof.

15. The fruit, vegetable, root crop, tree nut, or prepared food of claim 10, wherein said edible composition consists essentially of polyvinyl acetate in amounts effective to produce a high gloss coating, wherein said polyvinyl acetate is dissolved in a low molecular weight alcohol.

* * * * *